(12) United States Patent
Drabarek

(10) Patent No.: US 6,297,884 B1
(45) Date of Patent: *Oct. 2, 2001

(54) INTERFEROMETRIC INSTRUMENT PROVIDED WITH AN ARRANGEMENT FOR PRODUCING A FREQUENCY SHIFT BETWEEN TWO INTERFERING BEAM COMPONENTS

(75) Inventor: Pawel Drabarek, Tiefenbronn (DE)

(73) Assignee: Robert Bosch BmGH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,312

(22) Filed: May 22, 1998

(30) Foreign Application Priority Data

May 26, 1997 (DE) .............................. 197 21 882

(51) Int. Cl.$^7$ ........................................ G01B 9/02
(52) U.S. Cl. ...................... 356/489; 356/497; 356/511
(58) Field of Search .................... 356/345, 349, 356/351, 357, 359, 360, 489, 497, 511, 512, 479

(56) References Cited

U.S. PATENT DOCUMENTS 5,321,501 * 6/1994 Swanson et al. ................... 356/345

FOREIGN PATENT DOCUMENTS

| 39 06 118 | 8/1990 | (DE) . |
| 41 08 944 | 9/1992 | (DE) . |
| 43 36 318 | 4/1995 | (DE) . |
| 195 22 262 | 1/1997 | (DE) . |
| 2 325 740 | 12/1998 | (GB) . |

OTHER PUBLICATIONS

T. Dressel et al., "Three–Dimensional Sensing of Rough Surfaces By Coherence Radar", Applied Optics, vol. 31, No. 7, Mar. 1, 1992, pp. 919–925.

* cited by examiner

Primary Examiner—Samuel A. Turner
(74) Attorney, Agent, or Firm—Kenyon & Kenyon

(57) ABSTRACT

An interferometric instrument that includes a radiation generating unit for emitting briefly coherent radiation is used for sensing the surfaces of a test object by determining an interference maximum. Precise determination of the interference maximum, and therefore precise sensing of the test object, are achieved by providing, in the optical path of the first beam component and/or in the optical path of the second beam component, an arrangement which produces a frequency shift between the two interfering beam components and by providing a beam splitting arrangement, located in front of the photodetector arrangement in the optical path of the interfered radiation upstream from the photodetector device, which can be used to split the beams into at least two spectral components and supply them to the photodetector arrangement either directly or via additional elements on the photodetectors assigned to the components.

12 Claims, 1 Drawing Sheet

INTERFEROMETRIC INSTRUMENT PROVIDED WITH AN ARRANGEMENT FOR PRODUCING A FREQUENCY SHIFT BETWEEN TWO INTERFERING BEAM COMPONENTS

FIELD OF THE INVENTION

The present invention relates to an interferometric instrument for scanning the rough surfaces of a test object. The interferometric instrument of the present invention includes a radiation generating unit, which emits briefly coherent radiation having different spectral components, and a beam splitter, which produces a first and a second beam component. One beam component is aimed at the test object surface to be sensed and the other beam component is aimed at a device with a reflective element for periodically changing the light path. The interferometric instrument of the present invention also has an interference element, which causes the radiation coming from the test object surface and the radiation coming from the reflecting device to interfere with one another, and a photodetector arrangement, which absorbs the interfered radiation and supplies electrical signals to an analysis circuit.

BACKGROUND INFORMATION

A known interferometric instrument is described in the publication by T. Dresel, G. Häusler, H. Vanzke entitled "Three-Dimensional Sensing of Rough Surfaces by Coherence Radar", App. Opt., Vol. 3, No. 7, dated Mar. 1, 1992. This publication proposes an interferometer with a briefly coherent light source and a piezoelectric mirror for sensing rough surfaces. In the measuring instrument, a first beam component in the form of a light wave radiated back from a test object has a second beam component in the form of a reference wave superimposed upon it. The two light waves have a very short coherence length (just a few $\mu$m) so that the interference contrast reaches its maximum when the optical path difference is zero. A reflecting element in the form of a piezoelectric mirror is provided for changing the light path of the reference wave. The distance to the test object can be determined by comparing the position of the piezoelectric mirror with the time at which the interference maximum occurs. However, the precise measurement of the interference maximum is not easily accomplished.

SUMMARY OF THE INVENTION

An object of the present invention is to provide an interferometric instrument that is capable of accomplishing an increased measuring accuracy. The present invention therefore calls for an arrangement which produces a frequency shift between the two interfering beam components to be provided in the optical path of the first beam component and/or in the optical path of the second beam component. The present invention also includes a beam splitting arrangement, which splits the beams into at least two spectral components and supplies them to the photodetector arrangement either directly or via additional elements on the photodetectors assigned to the components. These additional elements are provided in front of the photodetector arrangement in the optical path of the interfered radiation.

The frequency shift in the two interfering beam components makes it possible to conduct a heterodyne interferometric analysis, and, as a result, a simplified and improved detection of the interference maximum occurs. (Details regarding the heterodyne interferometric method itself can be found in the literature.) By splitting the interfered radiation in the beam splitting arrangement, the minimum phase difference can be measured through heterodyne interferometric element in the analysis circuit for each spectral component. Since the phase differences can be very precisely measured by means of heterodyne interferometry on the basis of the zero crossings, the analysis circuit can be used to precisely determine the interference maximum, which forms the envelope of the higher-frequency signal components on which the analysis is based. As a result, it is possible to precisely assign the minimum phase differences to the relatively flat interference maximum.

The present invention calls for the beam splitting arrangement to be a spectral prism in order to obtain the heterodyne signals from the light of the spectral components or the various wavelengths.

Another advantageous embodiment for obtaining the various spectral components consists of assigning opposite polarities to the various spectral components coming from the different light sources of the radiation generating unit and designing the beam splitting arrangement as a polarization beam splitter. The use of at least two light sources provides a high light intensity for the photodetectors, therefore improving the analysis.

The fact that the minimum phase difference of the interfered radiation can be analyzed for the various spectral components in the analysis circuit, using heterodyne interferometric techniques, and assigned to the interference maximum increases the accuracy of the interference maximum measurement. The design of the measuring instrument is simplified by designing the arrangement as an acousto-optical modulator, driven by a modulator driver, which is positioned between the first beam splitter and the test object in the optical path of the first beam component.

The device for changing the light path may be provided with an acousto-optical deflector arrangement with at least two acousto-optical deflectors that are followed by the stationary reflecting element, which is positioned in the optical path of the second beam component in order to change its light path. Further, the deflectors may be frequency-modulated and arranged in relation to the incoming second beam component arriving via a compensation grating and in relation to the reflecting element so that the second beam component, which is also supplied to the interference element via the compensating grating, undergoes the change in its light path when it is deflected in the deflectors. As a result of this arrangement, a simplified and more accurate analysis is achieved, since this arrangement avoids the use of a mechanically moving reflecting element. The light path can be very precisely determined and assigned to the interference maximum.

Since the two deflectors are driven by two deflector drivers with slightly different carrier frequencies, which causes the second beam component to undergo a frequency shift, it is no longer necessary to use an additional acousto-optical modulator to generate the heterodyne frequency. Instead, the existing acousto-optical deflectors, which produce a change in the light path, are used to generate the heterodyne frequency. If the modulation frequency of the carrier frequencies is a few tens of MHZ, for example, the slight frequency difference between the carrier frequencies can amount to 0.5 MHZ. The deflector drivers can consist of two driver stages of a deflector driver unit.

To achieve a simple design, the modulation frequency of the carrier frequencies can be generated by a common control unit, to which the two deflector drivers can also be connected. With a simple design for accurate analysis, for example, the first deflector deflects the incoming beam component by an angle that is variable over time, as a function of the frequency, while the second deflector resets the angular deflection so that the second beam component continues to move in the direction of incidence parallel to the first deflector. The reflecting element is designed as a diffraction grating oriented at an angle to the beam component leaving the second deflector so that the second beam component is radiated back in the direction of incidence.

According to the present invention, signal processing and analysis can be achieved by combining the control unit and a driving unit to form an analysis circuit. Information about the modulation frequency of the carrier frequencies is sent to the analysis circuit, and the analysis circuit can be used to measure the distance to the measuring point on the test object on the basis of the information and the signals.

In a suitable embodiment, a collimator is positioned between the radiation generating unit and the first beam splitter, a focusing lens is positioned between the beam splitter and the test object, and a mirror is positioned between the first beam splitter and the compensation grating.

DETAILED DESCRIPTION

Figure 1:
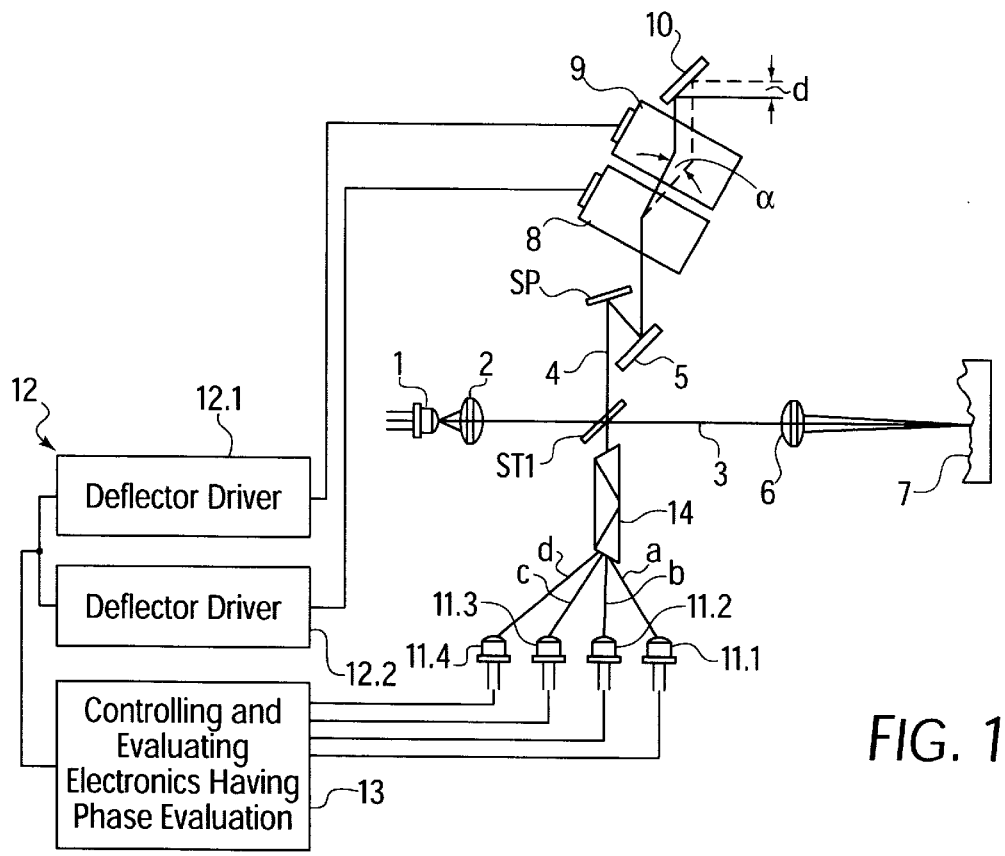
FIG. 1 shows a schematic design of a measuring instrument according to a first embodiment of the present invention.

FIG. 1 shows an interferometric instrument for sensing a test object 7. A radiation generating unit 1 has a briefly coherent light source to which a collimator 2 is connected in series. The collimated beam is split into a first and a second beam component 3 and 4 in a first beam splitter ST1. First beam component 3 is directed to the surface of test object 7 via a focusing lens 6. After being reflected back, the first beam returns to first beam splitter ST1.

Second beam component 4, which is split in first beam splitter ST1, is directed to a mirror SP on a compensation grating 5, from where it is deflected to two consecutive acousto-optical deflectors 8, 9, which are driven by a driver unit 12 with deflector drivers 12.1, 12.2 respectively assigned to deflectors 8, 9. Deflector drivers 12.1, 12.2, in turn, are operated by a common control and analysis circuit 13. The frequency modulation causes the deflection angle of second beam component 4 to vary by an angle α in first acousto-optical deflector 8. In second acousto-optical deflector 9, second beam component 4 is subsequently deflected again in a direction in which it strikes first acousto-optical deflector 8. This produces a parallel shift in second beam component 4 as it leaves second acousto-optical deflector 9, with this second beam component 4 illuminating a reflecting element in the form of a diffraction grating 10 (retro-grating). Diffraction grating 10 is inclined at a specific angle and designed (e.g. with the blaze-of-grating technique) so that, regardless of the parallel shift, diffracted first beam component 4 is radiated back to the interferometric arrangement with the first beam splitter ST1 via compensation grating 5 and mirror SP positioned optically parallel to diffraction grating 10, superimposing itself on first beam component 3 coming from beam splitter ST1, which also serves as an interference element, and interfering with the latter. The interference contrast reaches its maximum when both beam components 3 and 4 have covered the same optical distance. The interfered radiation passes from first beam splitter ST1 through a spectral prism 14, which splits it into spectral components a, b, c, d. Spectral components a, b, c, and d are respectively directed to a corresponding one of the photodetectors 11.1, 11.2, 11.3, 11.4. The electrical signals of the photodetectors 11.1, 11.2, 11.3, 11.4 are sent to the control and analysis circuit 13 in order to determine the interference maximum.

Since both acousto-optical deflectors 8, 9 are arranged so that the angular deflection of first deflector 8 is reset in second deflector 9, and second beam component 4 shifts only in parallel and is directed to reflecting diffraction grating 10 positioned at an angle, the light path or optical path (run time) of second beam component 4 is modulated. When the optical path difference between both beam components 3, 4 is zero, photodetectors 11.1, 11.2, 11.3, 11.4 assigned to spectral components a, b, c, d also detect the interference maximum. The distance to test object 7 can be determined by comparing the time at which the interference maximum or the signal maximum of the photodetectors 11.1, 11.2, 11.3, 11.4 is reached with the instantaneous frequency of driver unit 12 in control and analysis circuit 13.

To achieve a heterodyne interferometric analysis, both acousto-optical deflectors 8, 9 are driven by both deflector drivers 12.1, 12.2 with slightly different carrier frequencies, with the frequency difference amounting to 0.5 MHZ, for example in the case of a carrier frequency of a few tens of MHZ. As a result, the second beam component undergoes a frequency shift that is equal to twice the difference in carrier frequencies, for example 1 MHZ. The carrier frequencies are modulated by the common control unit in the form of control and analysis circuit 13, thereby modulating the light path of second beam component 4. The distance to test object 7 can be measured, for example, by comparing the time at which the heterodyne interference signal maximum is reached with the instantaneous frequency of the control unit.

As is generally known, the heterodyne interferometric analysis in control and analysis circuit 13 is based on detecting of the minimum phase difference. The minimum phase difference is detected for various spectral components a, b, c, d, and the minimum phase differences of the heterodyne signals are used to determine the zero optical phase difference between both beam components 3, 4. The minimum phase differences of the heterodyne signals are assigned to the roughly measured interference maximum, making it possible to measure the latter more precisely than is possible by measuring the interference maximum directly, since this usually has a relatively flat shape.

Photodetectors 11.1, 11.2, 11.3, 11.4 can consist of a photodiode array which is illuminated by briefly coherent broadband light source 1 via spectral prism 14 according to wavelength.

Figure 2:
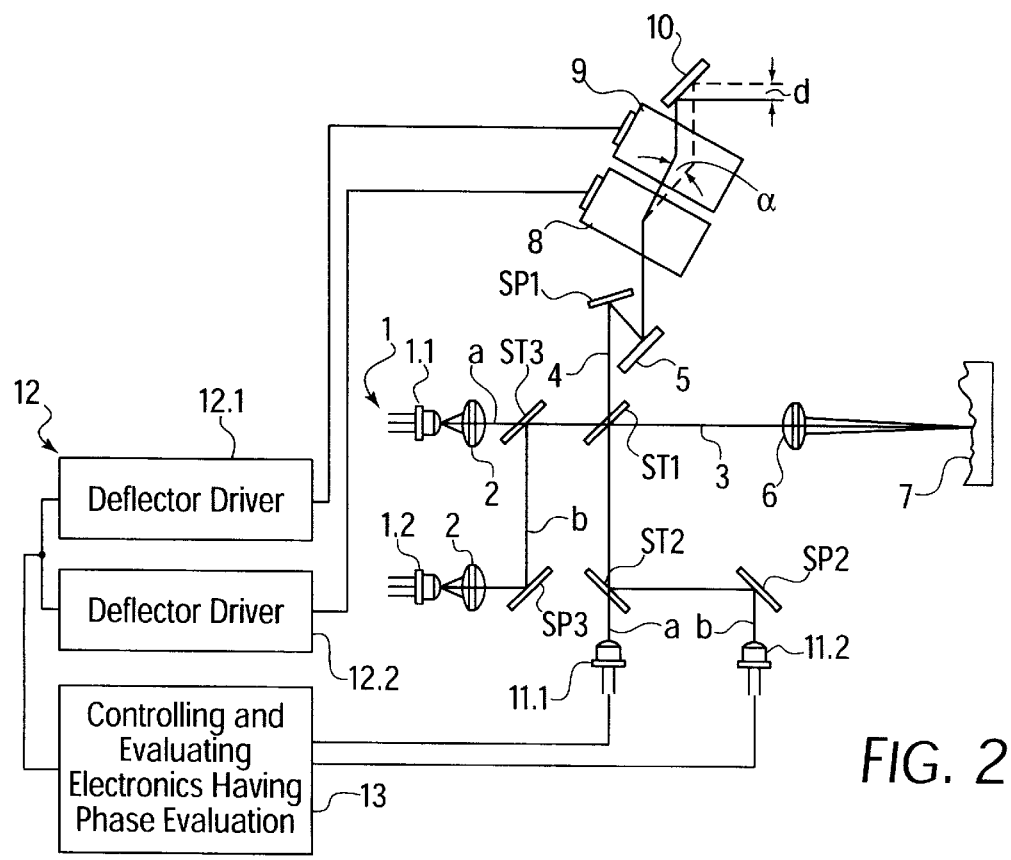
FIG. 2 shows a schematic design of a measuring instrument according to a second embodiment of the present invention.

FIG. 2 shows a measuring instrument according to a second embodiment of the present invention. The difference between the embodiment shown in FIG. 1 and the embodiment shown in FIG. 2 lies in radiation generating unit 1 and the beam splitting arrangement.

For example, radiation generating unit 1 has two light sources 1.1, 1.2. Light source 1.1 has the required short coherence length. Light source 1.2, which can have a long coherence length, has a medium wavelength that is different from the medium wavelength of light source 1.1. The light from both light sources 1.1, 1.2 is combined into a coaxial beam before entering the interferometric system, with the radiation from light source 1.2 being directed in the form of spectral component b to an additional mirror SP3 and on to an additional beam splitter ST3, to which spectral component a coming from light source 1.1 is also supplied. According to the first embodiment, the coaxial beam containing spectral components a, b is supplied to beam splitter ST1, which produces both beam components 3, 4 as in the first embodiment. The arrangement of the elements in the light paths of both beam components 3, 4 corresponds to the design shown in FIG. 1.

The interfered radiation in beam splitter ST1, which also serves as an interference element, is split and supplied to both photodetectors 11.1, 11.2. This can be done by designing additional beam splitter ST3 and a beam splitter ST2 positioned in the optical path of the interfered radiation as polarization beam splitters and polarizing the beams from both light sources 1.1, 1.2 perpendicularly to one another. An additional mirror SP2 can be provided in order to direct the radiation to the one photodetector 11.2.

Just like in the first embodiment, an optical path difference of zero, which results from the parallel shift and changed in the light path of second beam component 4 produced by this shift, is roughly determined by the position of the interference maximum of the signal obtained for light source 1 and precisely determined by the minimum phase difference between the heterodyne signals of both light sources 1.1, 1.2 in the measuring instrument, using control and analysis unit 13. It is thus possible to precisely determine the position of the maximum, and therefore precisely sense the test object 7, even with a relatively broad interference maximum.

What is claimed is:

1. An interferometric instrument for scanning a surface of a test object, comprising:
   a radiation generating unit for emitting briefly coherent radiation having a plurality of spectral components;
   an arrangement for periodically changing a light path of a received beam component, the arrangement including at least two acousto-optical deflectors and a stationary reflecting element that receives the received beam component directly from the at least two acousto-optical deflectors;
   a beam splitter device for producing a first beam component and a second beam component in response to the briefly coherent radiation, the first beam component being aimed at the surface of the test object, and the second beam component being aimed at the reflecting element;
   an interference element for causing the first beam component reflected from the surface of the test object and the second beam component reflected from the reflecting element to interfere with one another in order to produce an interfered radiation;
   a photodetector arrangement including a plurality of photodetectors, each one of the plurality of photodetectors producing a corresponding one of a plurality of electrical signals in response to the interfered radiation;
   an analysis unit having at least one input for receiving the plurality of electrical signals;
   a frequency shift arrangement for producing a frequency shift between the first beam component and the second beam component and being provided in an optical path of at least one of the first beam component and the second beam component; and
   a beam splitting arrangement for splitting the interfered radiation into the plurality of spectral components and for supplying each one of the plurality of spectral components to a corresponding one of the plurality of photodetectors, wherein the beam splitting arrangement is positioned in an optical path of the interfered radiation upstream from the photodetector arrangement.

2. The interferometric instrument according to claim 1, further comprising a plurality of additional elements, each one of the plurality of additional elements being associated with a corresponding one of the plurality of photodetectors, wherein the beam splitting arrangement supplies each one of the plurality of spectral components to a corresponding one of the plurality of photodetectors via an associated one of the plurality of additional elements.

3. The interferometric instrument according to claim 1, wherein the beam splitting arrangement includes a spectral prism.

4. An interferometric instrument for scanning a surface of a test object, comprising:
   a radiation generating unit for emitting briefly coherent radiation having a plurality of spectral components;
   an arrangement for periodically changing a light path of a received beam component, the arrangement including a reflecting element;
   a beam splitter device for producing a first beam component and a second beam component in response to the briefly coherent radiation, the first beam component being aimed at the surface of the test object, and the second beam component being aimed at the reflecting element;
   an interference element for causing the first beam component reflected from the surface of the test object and the second beam component reflected from the reflecting element to interfere with one another in order to produce an interfered radiation;
   a photodetector arrangement including a plurality of photodetectors, each one of the plurality of photodetectors producing a corresponding one of a plurality of electrical signals in response to the interfered radiation;
   an analysis unit having at least one input for receiving the plurality of electrical signals;
   a frequency shift arrangement for producing a frequency shift between the first beam component and the second beam component and being provided in an optical path of at least one of the first beam component and the second beam component; and
   a beam splitting arrangement for splitting the interfered radiation into the plurality of spectral components and for supplying each one of the plurality of spectral components to a corresponding one of the plurality of photodetectors, wherein the beam splitting arrangement is positioned in an optical path of the interfered radiation upstream from the photodetector arrangement, wherein the radiation generating unit includes a plurality of light sources, and wherein the beam splitting arrangement is a polarization beam splitter, each one of the plurality of light sources corresponding to a corresponding one of the plurality of spectral components, each one of the plurality of spectral components having a polarity that is opposite to a polarity of another one of the plurality of spectral components.

5. The interferometric instrument according to claim 1, further comprising a heterodyne interferometric device for analyzing a minimum phase difference of the interfered radiation with respect to the plurality of spectral components, wherein the analysis unit assigns the minimum phase difference to an interference maximum.

6. The interferometric instrument according to claim 1, wherein the frequency shift arrangement is an acousto-optic modulator that is driven by a modulator driver positioned between the beam splitter device and the test object in the optical path of the first beam component.

7. An interferometric instrument for scanning a surface of a test object, comprising:

a radiation generating unit for emitting briefly coherent radiation having a plurality of spectral components;

an arrangement for periodically changing a light path of a received beam component, the arrangement including an acousto-optical deflector arrangement and a reflecting element;

a beam splitter device for producing a first beam component and a second beam component in response to the briefly coherent radiation, the first beam component being aimed at the surface of the test object, and the second beam component being aimed at the reflecting element;

an interference element for causing the first beam component reflected from the surface of the test object and the second beam component reflected from the reflecting element to interfere with one another in order to produce an interfered radiation;

a photodetector arrangement including a plurality of photodetectors, each one of the plurality of photodetectors producing a corresponding one of a plurality of electrical signals in response to the interfered radiation;

an analysis unit having at least one input for receiving the plurality of electrical signals;

a frequency shift arrangement for producing a frequency shift between the first beam component and the second beam component and being provided in an optical path of at least one of the first beam component and the second beam component;

a beam splitting arrangement for splitting the interfered radiation into the plurality of spectral components and for supplying each one of the plurality of spectral components to a corresponding one of the plurality of photodetectors, wherein the beam splitting arrangement is positioned in an optical path of the interfered radiation upstream from the photodetector arrangement; and a compensation grating for aiming the second beam component to the reflecting element and to the interference element, wherein the reflecting element and the acousto-optical deflector arrangement are positioned in the optical path of the second beam component as determined by the compensation grating and the acousto-optical deflector arrangement includes:
a first acousto-optical deflector, and
a second acousto-optical deflector, wherein the reflecting element is a stationary reflecting element, and wherein each one of the first acousto-optical deflector and the second acousto-optical deflector is frequency-modulated and positioned in relation to the second beam component to cause the optical path of the second beam component to change when the second beam component is deflected by a predetermined amount by the first acousto-optical deflector and the second acousto-optical deflector.

8. The interferometric instrument according to claim 7, further comprising:

a first deflector driver for driving the first acousto-optical deflector and operating in accordance with a first carrier frequency; and a second deflector driver for driving the second acousto-optical deflector and operating in accordance with a second carrier frequency that is different than the first carrier frequency in order to produce a frequency shift in the second beam component.

9. The interferometric instrument according to claim 8, wherein the first carrier frequency and the second carrier frequency are modulated by the analysis unit.

10. The interferometric instrument according to claim 7, wherein the first acousto-optical deflector deflects the second beam component by an angular deflection that is variable over time, and wherein the second acousto-optical deflector resets the angular deflection so that the second beam component moves parallel to the first acousto-optical deflector in a direction of incidence, and wherein the reflecting element includes a diffraction grating which is oriented at an angle to the second beam component at which the second acousto-optical deflector causes the second beam component to radiate back in the direction of incidence.

11. The interferometric instrument according to claim 10, wherein each one of the first deflector driver and the second deflector driver supplies the analysis unit with information corresponding to a modulation frequency of the first carrier frequency and a modulation frequency of the second carrier frequency, and wherein the analysis unit measures a distance to a test point on the test object on the basis of the plurality of electrical signals produced by the plurality of photodetectors.

12. The interferometric instrument according to claim 7, further comprising:

a collimator positioned between the radiation generating unit and the beam splitter device;

a focusing lens positioned between the beam splitter device and the test object; and a mirror positioned between the beam splitter device and the compensation grating.

* * * * *